(12) United States Patent
Rana

(10) Patent No.: US 7,532,445 B2
(45) Date of Patent: May 12, 2009

(54) TRANSIENT VOLTAGE CLAMPING CIRCUIT

(75) Inventor: Sakti Pada Rana, Singapore (SG); Swarnali Rana, legal representative, Singapore (GB)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 113 days.

(21) Appl. No.: 10/498,727

(22) PCT Filed: Dec. 14, 2001

(86) PCT No.: PCT/SG01/00253

§ 371 (c)(1),
(2), (4) Date: Jan. 23, 2006

(87) PCT Pub. No.: WO03/052898

PCT Pub. Date: Jun. 26, 2003

(65) Prior Publication Data

US 2006/0181822 A1    Aug. 17, 2006

(51) Int. Cl.
*H02H 3/22* (2006.01)
*H02H 9/00* (2006.01)

(52) U.S. Cl. .................. 361/56; 327/536; 327/539; 363/37; 361/111

(58) Field of Classification Search .............. 327/9.1, 327/309, 328, 525, 536, 392, 398, 399; 323/222, 323/313; 363/21, 37, 56, 95, 97; 361/56, 361/104, 110, 111; 365/189.08
See application file for complete search history.

(56) References Cited

U.S. PATENT DOCUMENTS

| | | | | |
|---|---|---|---|---|
| 3,995,429 A * | 12/1976 | Peters | ...................... | 60/641.8 |
| 4,464,590 A * | 8/1984 | Rapp | ........................... | 327/51 |
| 4,533,846 A * | 8/1985 | Simko | ........................ | 327/321 |
| 4,723,108 A * | 2/1988 | Murphy et al. | ............. | 323/315 |
| 5,184,033 A * | 2/1993 | Chiao et al. | ................... | 326/87 |
| 5,436,552 A * | 7/1995 | Kajimoto | .................... | 323/313 |
| 5,483,406 A | 1/1996 | Bennett et al. | ................ | 361/56 |
| 5,530,640 A * | 6/1996 | Hara et al. | .................... | 363/60 |
| 5,561,391 A * | 10/1996 | Wellnitz et al. | ............. | 327/309 |
| 5,708,549 A * | 1/1998 | Croft | ........................... | 361/56 |
| 5,798,635 A * | 8/1998 | Hwang et al. | ............... | 323/222 |
| 5,804,958 A * | 9/1998 | Tsui et al. | .................... | 323/313 |
| 5,859,768 A * | 1/1999 | Hall et al. | ................. | 363/21.13 |
| 5,877,927 A * | 3/1999 | Parat et al. | .................... | 361/56 |
| 5,930,096 A | 7/1999 | Kim | ........................... | 361/91 |
| 5,986,493 A * | 11/1999 | Li | ............................... | 327/328 |
| 6,078,204 A * | 6/2000 | Cooper et al. | ............... | 327/309 |
| 6,232,832 B1 * | 5/2001 | Kirkpatrick, II | ............. | 327/560 |
| 6,459,167 B1 * | 10/2002 | Yamanashi | .................. | 307/9.1 |
| 6,636,025 B1 * | 10/2003 | Irissou | ....................... | 323/313 |
| 6,865,116 B2 * | 3/2005 | Kim et al. | .............. | 365/189.08 |

* cited by examiner

*Primary Examiner*—Akm E Ullah
*Assistant Examiner*—M'Baye Diao
(74) *Attorney, Agent, or Firm*—Lisa K. Jorgenson; David V. Carlson

(57) ABSTRACT

A circuit for transient voltage clamping, the circuit being internal to a motor driver ASIC for a hard drive and including a power transistor for sinking a power supply voltage subjected to transient variation, a reference circuit for deriving a first reference voltage from a second reference voltage and the power supply voltage, and an amplifier circuit for receiving the first reference voltage as input and for driving the power transistor.

23 Claims, 3 Drawing Sheets

TRANSIENT VOLTAGE CLAMPING CIRCUIT

BACKGROUND OF THE INVENTION

1. Field of the Invention

The present invention relates to a circuit for transient voltage clamping and, in particular, a circuit for transient voltage clamping within an ASIC that is a motor driver for a disk drive.

2. Description of the Related Art

In typical hard disk drive (HDD) applications, specific integrated circuits (ASICs) are used for driving the spindle and voice coil motors. Under certain conditions, inductive loads may dump their stored energy (in the form of large currents) on the power supply of the ASIC causing the voltage in the power supply to rise. Reverse isolation blocking diodes are usually provided to prevent the system power supply from absorbing the excess energy. As a result, the drain voltage of the high side drivers may rise to levels which cause the destruction of the ASIC. Therefore a voltage clamp is required to be placed on the supply voltage of the ASIC for reducing the effects of such transient voltages from the inductive loads.

In order to address the above-mentioned problem, prior art solutions provide the following:

1. A transient voltage suppressor (TVS) can be used externally to the ASIC to clamp the voltage. This increases the cost of the HDD and the voltage tolerance of the TVS is often wide, which can lead to inadequate suppression of transient voltages. For example, if the required TVS operating range is 13.2V (i.e., 12V supply +10%) to 16V (the absolute rating) and TVS voltage tolerance is wide, it may not be able to effectively clamp in the required range.

2. An alternative is to put a very large capacitor on the ASIC power supply to absorb the dumped energy. However, such large capacitors are costly.

3. A simple voltage clamp circuit consisting of zener-npn or zener-nmos devices can also be used to absorb the dumped energy. Such a circuit can be integrated into the ASIC or may be external. However, the wide tolerance of activation voltage and long response time makes this circuit unsuitable for use in applications where the operating voltage range and the absolute maximum voltage of the ASIC are relatively close to each other. HDDs of small dimension require lower tolerances in activation voltage than are provided by these circuits.

BRIEF SUMMARY OF THE INVENTION

The present invention provides a transient voltage clamping circuit of an integrated circuit for a disk drive, the circuit including a power transistor for sinking a power supply voltage subjected to transient variation; a reference circuit for deriving a first reference voltage from a second reference voltage and the power supply voltage; and an amplifier circuit for receiving said first reference voltage as an input and for driving the power transistor.

Preferably, the transient voltage clamping circuit further includes a pull-down circuit connected to a gate terminal of the power transistor and an output of the amplifier circuit for controlling operation of the power transistor. Preferably, the pull-down circuit is adapted to sink the gate voltage at the gate terminal when the power supply voltage is less than a first threshold voltage, thereby turning off the power transistor. Preferably, the first threshold voltage is about 5 volts, and preferably, the pull-down circuit is adapted to sink the gate voltage at the gate terminal when the second reference voltage is less than a second threshold voltage. Preferably, the second threshold voltage is about 0.7 volts.

In accordance with another aspect of the present invention, the amplifier circuit includes a level shift circuit, a voltage multiplier circuit, and a buffer circuit.

In accordance with yet a further aspect of the present invention, the first reference voltage is derived from the second reference voltage via coupled n-MOS and p-MOS current mirror circuits.

Advantageously, embodiments of the transient voltage clamping circuit of the invention provide accurate activation, low cost and low tolerance in activation threshold voltage relative to the prior art.

DETAILED DESCRIPTION OF THE INVENTION

Figure 1:
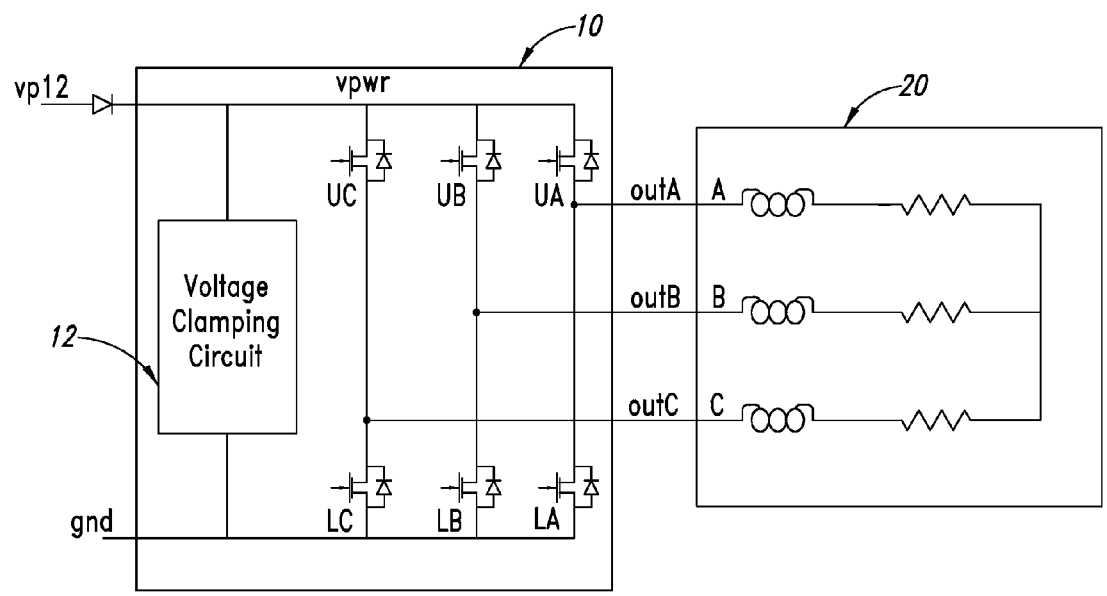
FIG. 1 is a block diagram of an ASIC and motor driver for a hard disk drive.

Referring to FIG. 1, a hard disk drive (not shown) includes a motor 20 which receives power through a power ASIC 10. The motor 20 receives power on lines A, B, C from power ASIC 10, each of those lines having an impedance model which includes inductive and resistive impedances. UA, UB and UC are gate drive signals for upper power DMOS transistors for each line A, B and C. LA, LB and LC are for corresponding lower power DMOS transistors. These DMOS transistors provide current to the motor 20.

Power ASIC 10 receives power from an external 12 volt power supply VP12. Power ASIC 10 includes a voltage clamping circuit 12 for clamping transient voltages which are dumped from the inductive loads in the motor 20 and is powered from the power supply rail of the power ASIC 10. The duty cycle of the dumped current is generally small (typically in the order of 3%) and therefore the location of the clamping circuit on the power ASIC 10 does not pose a power dissipation problem if an appropriate package is used.

Figure 2:
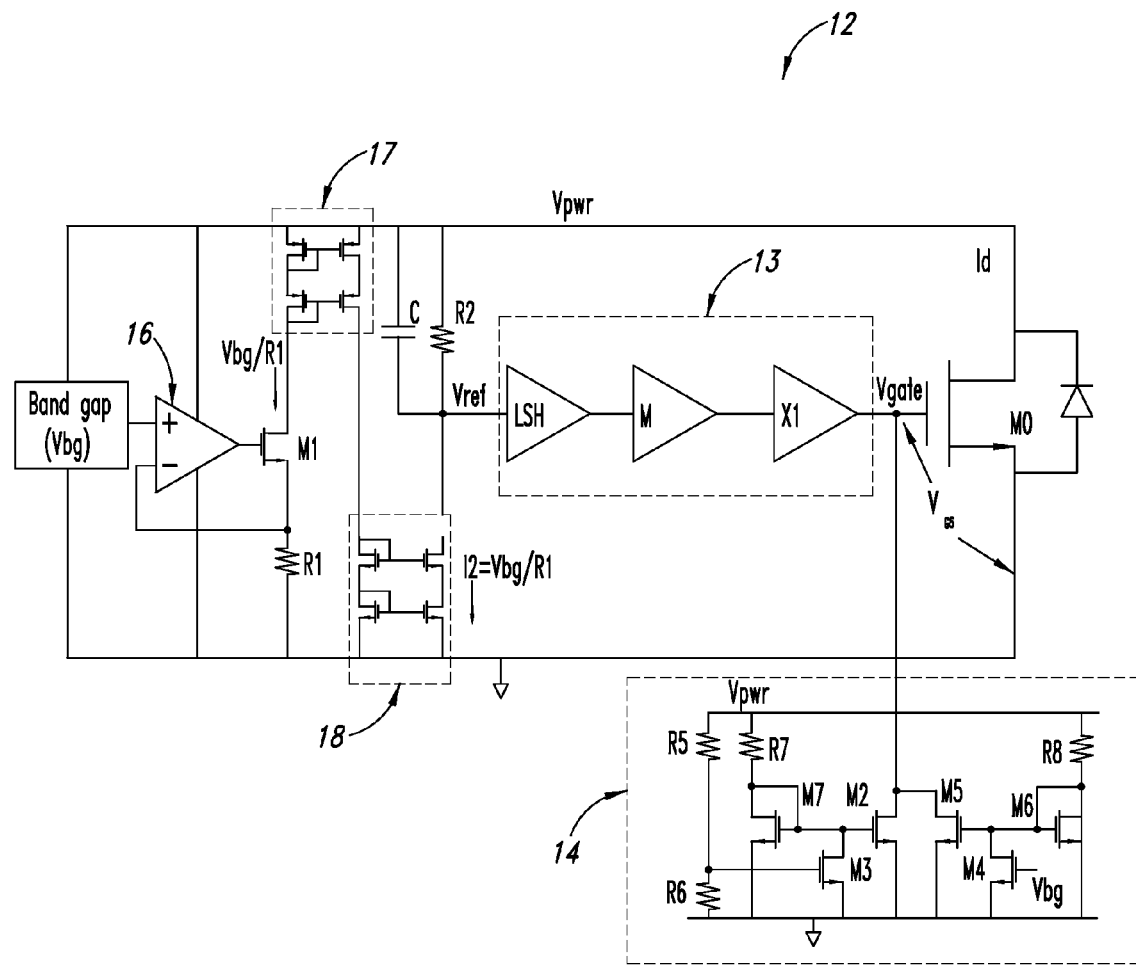
FIG. 2 shows a circuit for transient voltage clamping according to an embodiment of the invention.

FIG. 2 shows the voltage clamping circuit 12 in further detail. A reference voltage $V_{ref}$ feeds into an amplifier circuit 13 which drives a power transistor (M0) for sinking dumped current $I_d$. The reference voltage, $V_{ref}$, is determined according to the following equation:

$$V_{ref} = [Vpwr - R2 \cdot I2] = \left[Vpwr - \left(R2 \cdot \frac{Vbg}{R1}\right)\right] \quad (1)$$

Current I2 is generated at node $V_{ref}$ through p-MOS and n-MOS current mirrors 17,18 and is driven by an operational amplifier 16 in combination with MOSFET M1. The operational amplifier 16 is supplied with a band gap reference voltage, $V_{bg}$.

Resistor R2 and capacitor C are compensation components provided for increased circuit stability.

Coupled p-MOS and n-MOS current mirrors 17, 18 allow $V_{ref}$ to be varied with variations in the band gap reference voltage and the power supply voltage $V_{pwr}$.

Figure 3A:
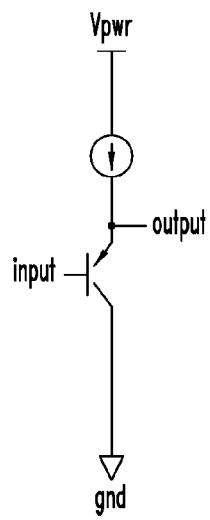
FIG. 3A shows a level shift circuit used in the embodiment of the transient voltage clamping circuit shown in FIG. 2.
Figure 3B:
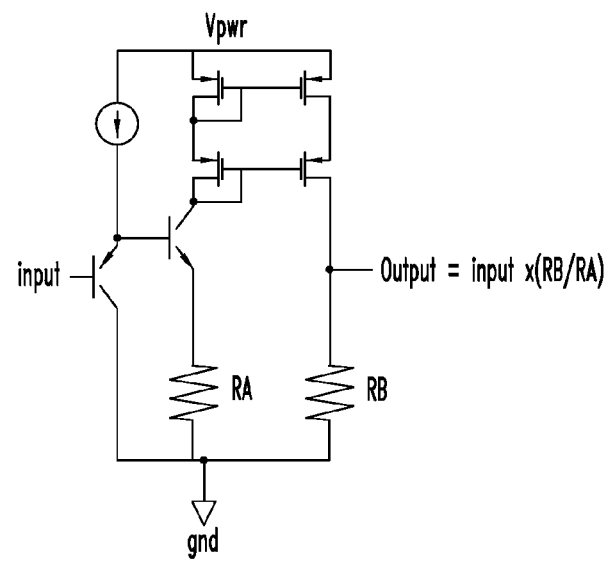
FIG. 3B shows the level shift circuit of FIG. 3A in combination with a multiplier-circuit used in the embodiment of the transient voltage clamping circuit shown in FIG. 2.
Figure 3C:
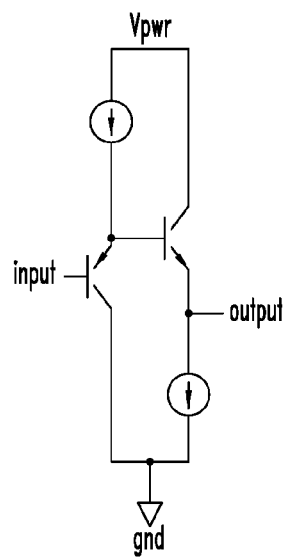
FIG. 3C shows a buffer circuit used in the embodiment of the transient voltage clamping circuit shown in FIG. 2.

Amplifier circuit 13 includes a level shift circuit (LSH), a multiplier circuit (M) and a buffer circuit (X1). These circuits are shown in FIGS. 3A, 3B and 3C, respectively. The level shift circuit is also shown in FIG. 3B, in combination with the multiplier circuit. The level shift circuit takes the reference voltage $V_{ref}$ and provides a higher operating voltage (by about $1 \times V_{be}=0.7V$) to the multiplier circuit.

The multiplier circuit receives the level shifted voltage and multiplies this by a factor, M, which is determined as the ratio of the resistances of resistors RB and RA shown in FIG. 3B. The multiplier circuit is included here in order to provide M times more $V_{gs}$ to the power transistor. This in turn enables the power transistor to handle greater current (by a factor of $M^2$) for the same gate, width and length without changing the activation voltage of the clamping circuit 12. The buffer circuit is provided between the multiplier circuit and the gate terminal of the power transistor so as to form a buffer between the power transistor and pull-down circuit 14 on the one hand and the driving circuits (including the multiplier, level shift, current mirrors and op-amp, etc.) on the other hand.

The equations for the circuit are as follows:

$$V_{gs} = \left[Vpwr - \left(R2 \cdot \frac{Vbg}{R1}\right)\right] \cdot M + \left(R3 \cdot \frac{Vbg}{R1}\right) \quad (2)$$

$$V_{gs} = V_{TH} + \sqrt{\frac{I_d}{K}} \quad (3)$$

Solving (1) and (2), we have $$I_d = K \cdot M^2 \cdot (Vpwer - Vclamp)^2 \quad (4)$$

Where:

$$K = \frac{1}{2} \cdot \mu \cdot C_{ox} \cdot \left(\frac{W}{L}\right) \cdot \lambda \quad (5)$$

μ is the channel mobility in power transistor M0;
$C_{ox}$ is the gate capacitance per unit area of power transistor M0;
W is the gate width for the power transistor M0;
L is the gate length for the power transistor M0;
λ is the channel length modulation effect; and
M is the Multiplication Factor defined by the resistor ratio (RB/RA) of the multiplier circuit;

Vclamp is defined as:

$$Vclamp = Vbg \cdot \frac{R2}{R1} + \frac{\left[V_{TH} + \left(R3 \cdot \frac{Vbg}{R1}\right)\right]}{M} \quad (6)$$

$V_{TH}$ is the DMOS Threshold voltage; and
R3 is resistor RB in the multiplier circuit.

The most important of the formulae shown above is the formula for determining Vclamp, which defines the threshold voltage of $V_{pwr}$ above which the clamp will activate. The clamping activation voltage can be adjusted using different resistor ratios (RB/RA) within the multiplier circuit. For example, if $V_{pwr}$ is 5 volts instead of 12 volts then the ratio RB/RA must be adjusted accordingly to ensure that the clamping circuit 12 operates properly within the ASIC.

A further feature of the clamping circuit 12 is the pull-down circuit 14. The pull-down circuit 14 operates to pull-down the gate voltage of the power transistor where $V_{pwr}$ is small (i.e., below 5 volts) or where $V_{pwr}$ rises quickly.

For the low $V_{pwr}$ cut off function, transistor M3 is designed (along with resistors R5 and R6) so as to be off until $V_{pwr}$ reaches 5 volts or greater. Resistors R5 and R6 form a voltage divider for providing a gate voltage to M3 which is selected so that its turn-on threshold voltage is just below 5 volts. When $V_{pwr}$ is less than 5 volts, M3 is off and consequently transistors M2 and M7 form a current mirror circuit which pulls down the gate of the power transistor M0, thereby disabling the clamping function. When M3 is turned on, it pulls the gates of transistors M2 and M7 to ground, thus disabling the current mirror formed by those transistors so that the gate of the power transistor is not pulled to ground. This part of the pull-down circuit 14 ensures that the clamping circuit 12 will not operate unless the power supply voltage, $V_{pwr}$ is at a sufficient level to enable correct operation of the clamping circuit 12. This is particularly important if the $V_{pwr}$ rises very slowly. For example, if $V_{pwr}$ rises slowly, $V_{bg}$ may have risen to the correct operating level before $V_{pwr}$ reaches a sufficient level to enable the clamping circuit 12 to work.

On the other hand, if the power supply rises very quickly, the clamping circuit 12 can be wrongly activated due to the time that it takes the band gap and operational amplifier to settle to the correct voltage levels. Transistor M4 is turned on or off by the level of the band gap reference voltage $V_{bg}$. The turn-on threshold of M4 is about 0.7 volts, which is the normal n-MOS operating threshold. M4 will not operate until $V_{bg}$ reaches the n-MOS threshold. The normal operating level of $V_{bg}$ is about 1.3 volts. Where the power supply voltage rises quickly and $V_{bg}$ lags behind, M4 will be off, thereby allowing transistors M5 and M6 (which form a current mirror) to operate to pull-down the gate terminal of the power transistor. After $V_{bg}$ rises to the correct level, M4 turns on and thereby pulls down the gates of transistors M5 and M6 to disable the current mirror and allow the clamp to operate without the gate of power transistor M0 being pulled down.

The described clamping circuit 12 is capable of handling large currents while having accurate clamping activation with low tolerance in activation threshold voltage and may be provided at a low cost. These advantages are provided as follows.

1. Low Cost

Use of a multiplying circuit reduces the necessary power transistor size by the factor M for the same current. Thus it is very silicon effective.

2. Low Tolerance in Activation Threshold Voltage

Given that (R2/R1)*>>[VTH+Vbg*(R3/R1)]/M Vclamp≅(R2/R1)*Vbg, which is independent of temperature. The tolerance is limited as the resistance matching between R1 and R2 can be achieved to within 0.5% and the band gap voltage (Vbg) can be trimmed with a trimming facility. This means that a total tolerance between R1 and R2 of +/−2% can be achieved.

3. Accuracy of Activation

The pull-down circuit ensures the correct clamping activation with minimal spurious clamping due to different power supply rise/fall slope.

All of the above U.S. patents, U.S. patent application publications, U.S. patent applications, foreign patents, foreign patent applications and non-patent publications referred to in this specification and/or listed in the Application Data Sheet, including but not limited to [insert list], are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A circuit for an integrated circuit for a disk drive, comprising:
a transient voltage clamping circuit that comprises:
a power transistor for sinking a power supply voltage subjected to transient variation;
a reference circuit for deriving a first reference voltage from a second reference voltage and said power supply voltage;
an amplifier circuit for receiving said first reference voltage as input and for driving said power transistor; and
a pull-down circuit connected to a gate terminal of said power transistor and an output of said amplifier circuit for controlling operation of said power transistor.

2. The circuit of claim 1, wherein the pull-down circuit is adapted to sink the gate voltage at said gate terminal when said power supply voltage is less than a first threshold voltage, to thereby turn off said power transistor.

3. The circuit of claim 2, wherein the first threshold voltage is about 5 volts.

4. The circuit of claim 1, wherein the pull-down circuit is adapted to sink the gate voltage at said gate terminal when said second reference voltage is less than a second threshold voltage to thereby turn off said power transistor.

5. The circuit of claim 4, wherein the second threshold voltage is about 0.7 volts.

6. The circuit of claim 1, wherein said amplifier circuit includes a level shift circuit, a voltage multiplier circuit and a buffer circuit.

7. The circuit of claim 6, wherein said level shift circuit is adapted to receive said first reference voltage as input and to output a level shifted voltage to said multiplier circuit, said multiplier circuit adapted to receive said level shifted voltage as input and to output a multiplied voltage to said buffer circuit and said buffer circuit is adapted to receive said multiplied voltage as input and to output a driving voltage to a gate terminal of said power transistor.

8. The circuit of claim 1, wherein the first reference voltage is derived from the second reference voltage via coupled n-MOS and p-MOS current mirror circuits of said reference circuit.

9. The circuit of claim 8, wherein in said reference circuit an input current of said coupled current mirror circuits is driven by a current driving transistor in combination with an operational amplifier, said operational amplifier receiving said second reference voltage as input.

10. A power circuit for a motor disk drive that receives power on a plurality of power lines coupled to the power circuit, the power circuit comprising:
a plurality of DMOS transistor pairs coupled between a voltage potential and a ground reference potential, each DMOS transistor pair coupled to a respective power line; and
a voltage clamping circuit coupled to the voltage potential and the ground reference potential and comprising:
a power transistor having a first terminal coupled to the voltage potential, a second terminal coupled to the ground reference potential, and a gate terminal;
an amplifier circuit having an input coupled to a voltage reference node and an output coupled to the gate terminal of the power transistor;
a pull-down circuit coupled to the voltage potential and the ground reference potential and having an output coupled to the gate terminal of the power transistor; and
a voltage reference circuit coupled to the voltage potential and the ground reference potential and having an output coupled to the voltage reference node on which the voltage reference circuit generates a first reference voltage.

11. The circuit of claim 10, wherein the pull-down circuit is configured to sink a voltage at the gate terminal of the power transistor when the voltage reference potential is less than a first threshold voltage to thereby turn off the power transistor.

12. The circuit of claim 11, wherein the voltage reference circuit is configured to derive the first reference voltage from a second reference voltage and the voltage potential.

13. The circuit of claim 12, wherein the pull-down circuit is configured to sink the voltage at the gate terminal of the power transistor when the second reference voltage is less than a second threshold voltage to thereby turn off the power transistor.

14. The circuit of claim 11, wherein the amplifier circuit comprises a level shift circuit having an input coupled to the voltage reference node and an output, a multiplier having an input coupled to the output of the level shift circuit and an output, and a buffer circuit having an input coupled to the output of the multiplier circuit and an output that forms the output of the amplifier circuit that is coupled to the gate of the power transistor.

15. The circuit of claim 14, wherein the voltage reference circuit comprises an n-MOS current mirror circuit and a p-MOS current mirror circuit that are configured to derive the second reference voltage from the first reference voltage.

16. The circuit of claim 15, wherein the voltage reference circuit comprises a current driving transistor coupled to an operational amplifier that receives the second reference voltage as an input for driving the n-MOS and p-MOS current mirror circuits.

17. The circuit of claim 16, wherein the reference voltage is determined in accordance with the following equation:

$$V_{ref} = [Vpwr - R2 \cdot I2] = \left[Vpwr - \left(R2 \cdot \frac{Vbg}{R1}\right)\right]$$

wherein:
Vpwr is the voltage potential;
R2 is a resistor coupled between the voltage reference potential and the voltage reference node;
I2 is current generated at the voltage reference node through the p-MOS and n-MOS current mirrors;
R1 is a resistor coupled between the ground reference potential and the current driving transistor of the voltage reference circuit; and
Vbg is a band gap voltage that is supplied to the operational amplifier.

18. A control circuit for a hard disk, comprising:
a power switch for sinking a power supply voltage subjected to transient variation, the power switch having a control terminal;
a power switch control circuit having an output coupled to the control terminal of the power switch, the power switch control circuit configured to regulate operation of the power switch through a fixed voltage, wherein the power switch control circuit comprises a voltage reference circuit receiving as input a band gap voltage and a power supply voltage and generating as output therefrom a first reference voltage; and a pull-down circuit having an output coupled to the control terminal of the power switch and configured to sink a voltage at the control terminal when the power supply voltage is less than a first threshold to thereby turn off the power transistor, wherein the pull-down circuit is configured to sink a voltage at the control terminal of the power switch when the band gap voltage is less than a second threshold voltage to thereby turn off the power transistor.

19. The circuit of claim 18, wherein the power switch control circuit comprises a voltage reference circuit receiving as input a band gap voltage and a power supply voltage and generating as output therefrom a first reference voltage.

20. The circuit of claim 18, wherein the amplifier circuit comprises a level shift circuit having an input configured to receive the first reference voltage and an output, a voltage multiplier circuit having an input coupled to the output of the level shift circuit and further having an output, and a buffer circuit having an input coupled to the output of the voltage multiplier circuit and further having an output that constitutes the output of the amplifier circuit, which is coupled to the control terminal of the power switch.

21. A power circuit for a motor disk drive that receives power on a plurality of power lines coupled to the power circuit, the power circuit comprising:

a plurality of DMOS transistor pairs coupled between a voltage potential and a ground reference potential, each DMOS transistor pair coupled to a respective power line; and a voltage clamping circuit coupled to the voltage potential and the ground reference potential and comprising:
 a power transistor having a first terminal coupled to the voltage potential, a second terminal coupled to the ground reference potential, and a gate terminal;
 amplifier circuit having an input coupled to a voltage reference node and an output coupled to the gate terminal of the power transistor;
 a pull-down circuit coupled to the voltage potential and the ground reference potential and having an output coupled to the gate terminal of the power transistor;
 a voltage reference circuit coupled to the voltage potential and the ground reference potential and having an output coupled to the voltage reference node on which the voltage reference circuit generates a first reference voltage;

wherein the pull-down circuit is configured to sink a voltage at the gate terminal of the power transistor when the voltage reference potential is less than a first threshold voltage to thereby turn off the power transistor;

wherein the amplifier circuit comprises a level shift circuit having an input coupled to the voltage reference node and an output, a multiplier having an input coupled to the output of the level shift circuit and an output, and a buffer circuit having an input coupled to the output of the multiplier circuit and an output that forms the output of the amplifier circuit that is coupled to the gate of the power transistor;

wherein the voltage reference circuit comprises an n-MOS current mirror circuit and a p-MOS current mirror circuit that are configured to derive the second reference voltage from the first reference voltage;

wherein the voltage reference circuit comprises a current driving transistor coupled to an operational amplifier that receives the second reference voltage as an input for driving the n-MOS and p-MOS current mirror circuits; and wherein the reference voltage is determined in accordance with the following equation:

$$V_{ref} = [Vpwr - R2 \cdot I2] = \left[Vpwr - \left(R2 \cdot \frac{Vbg}{R1}\right)\right]$$

wherein:
 Vpwr is the voltage potential;
 R2 is a resistor coupled between the voltage reference potential and the voltage reference node;
 I2 is current generated at the voltage reference node through the p-MOS and n-MOS current mirrors;
 R1 is a resistor coupled between the ground reference potential and the current driving transistor of the voltage reference circuit; and
 Vbg is a band gap voltage that is supplied to the operational amplifier.

22. The power circuit of claim 21, wherein the voltage reference circuit is configured to derive the first reference voltage from a second reference voltage and the voltage potential.

23. The circuit of claim 21, wherein the pull-down circuit is configured to sink the voltage at the gate terminal of the power transistor when the second reference voltage is less than a second threshold voltage to thereby turn off the power transistor.

* * * * *